(12) United States Patent
Steffen

(10) Patent No.: US 6,223,871 B1
(45) Date of Patent: May 1, 2001

(54) CABLE DRUM WITH INTEGRATED FREQUENCY CONVERTER

(75) Inventor: Michael Steffen, Gauting (DE)

(73) Assignee: Wacker-Werke GmbH & Co., KG (DE)

( * ) Notice: Subject to any disclaimer, the term of this patent is extended or adjusted under 35 U.S.C. 154(b) by 0 days.

(21) Appl. No.: 09/341,044
(22) PCT Filed: Apr. 29, 1998
(86) PCT No.: PCT/EP98/02542
  § 371 Date: Jun. 30, 1999
  § 102(e) Date: Jun. 30, 1999
(87) PCT Pub. No.: WO98/54809
  PCT Pub. Date: Dec. 3, 1998

(30) Foreign Application Priority Data

May 27, 1997 (DE) .............................. 197 22 107

(51) Int. Cl.[7] .................................................. H02G 11/02
(52) U.S. Cl. ................ 191/12.4; 191/12 R; 191/12.2 R; 242/400; 74/155; 366/16
(58) Field of Search ............................ 191/12 R, 12.2 R, 191/12.4; 74/155; 242/400; 366/116

(56) References Cited

U.S. PATENT DOCUMENTS

| D. 289,603 | * | 5/1987 | An | D8/359 |
| D. 312,204 | * | 11/1990 | Nelson | D8/358 |
| D. 324,669 | * | 3/1992 | Co | D13/140 |
| 4,282,954 | * | 8/1981 | Hill | 191/12.4 |
| 4,721,833 | * | 1/1988 | Dubay | 191/12.4 |
| 4,845,990 | * | 7/1989 | Kitzinger et al. | 73/597 |

FOREIGN PATENT DOCUMENTS

| 33 10 311 | 9/1984 | (DE) . |
| 39 21 679 | 1/1991 | (DE) . |
| 44 05 391 | 9/1994 | (DE) . |
| 4405391A1 | * 9/1994 | (DE) ............... H05K/11/00 |
| 89 16 195 | 2/1995 | (DE) . |

* cited by examiner

Primary Examiner—S. Joseph Morano
Assistant Examiner—Frantz F. Jules
(74) Attorney, Agent, or Firm—Boyle Fredrickson Newholm Stein & Gratz S.C.

(57) ABSTRACT

A cable drum has a rotating winder fitted in a mounting and a frequency converter fitted on the winder. At least one socket outlet of the winder is electrically coupled to the frequency converter and is supplied with an electrical spatial frequency. The integration of the cable drum and frequency converter makes it easier to transport the equipment by reducing weight and the number of pieces.

12 Claims, 2 Drawing Sheets

CABLE DRUM WITH INTEGRATED FREQUENCY CONVERTER

BACKGROUND OF THE INVENTION

1. Field of the Invention

The invention relates to a cable drum having a winder which is rotatably mounted on the frame and which has a socket outlet mounted on it.

2. Description of the Related Art

Internal vibrators are often used on building sites in order to compact concrete. The internal vibrators are typically driven by asynchronous motors supplied with a special voltage and a special frequency. If, for example, an asynchronous motor present in the internal vibrator and having an attached unbalanced mass is to achieve a rotational speed of 12,000 rev/min, an excitation frequency of 200 Hz is required in the case of a 2-pole machine. The public power network, however, only provides a frequency of 50 Hz.

For this reason, frequency converters which were usually supplied with three-phase current to couple the motor to the public power network were used in the past. FIG. 2 shows an example of such an arrangement. These frequency converters were very difficult to handle on account of their high weight.

According to FIG. 2, an internal vibrator 1 is connected to a conventional frequency converter 4 via a switch 2 and a cable 3. Since, on building sites, greater distances usually have to be bridged between the working location and the nearest fixed mains connection, the frequency converter 4 is connected to a generally known cable drum 5. A cable 6 can be unwound from the cable drum 5 and connected to the mains connection, which is a long way off.

In recent times, due to the provision of appropriate power electronics with corresponding semiconductors, it has become possible to miniaturize the frequency converter and, in this way, reduce its weight from, for example, 60 kg to 4 kg. Such a lighter frequency converter is still connected between the internal vibrator 1 and the cable drum 5 as a separate unit. When the internal vibrator is moved to different working locations, the frequency converter and the separate cable drum must therefore still be moved.

A cable drum having an integrated light source is described in DE-GM 7641166.

OBJECTS AND SUMMARY OF THE INVENTION

The object of the invention is to further improve the ease of manipulation of a building-site unit, in particular of an internal vibrator, in particular its mobility between a plurality of working locations.

This object is achieved according to the invention by a cable drum having a winder which is rotatably mounted on a frame and on which at least one socket outlet is arranged, and on which a cable can be wound. A frequency converter is fastened to the winder, and at least one of the socket outlets is electrically coupled to the frequency converter and is supplied with an electric special frequency.

Due to this integration of the cable drum and the frequency converter, only the cable drum, which in addition to the cable also carries the frequency converter, needs to be additionally moved when the internal vibrator is moved from one working location to another. Furthermore, components and weight can be reduced, since the converter requires no separate housing and no complicated voltage supply.

It is especially advantageous if the frequency converter is arranged in that region of the winder which is surrounded by the cable when the cable is wound onto the winder. There is usually sufficient construction space in the interior of the winder, i.e. inside the cable winding, in order to be able to accommodate the miniaturized frequency converter. In this way, the construction space used by the cable drum is optimally utilized.

A rotary axis of the winder expediently passes through the region. The frequency converter is, therefore, arranged close to the axis of symmetry of the cable drum, as a result of which the uniform rotation of the winder is not impaired during the winding and unwinding of the cable.

It is very advantageous that the conversion of the frequency in the frequency converter is effected essentially by electronic semiconductors. It is thereby possible to miniaturize the hitherto known large and difficult-to-manipulate frequency converter such that it can be accommodated in the cable drum.

In an especially advantageous embodiment of the invention, socket outlets, which are electrically connected to the cable, are arranged on one end face of the winder. At least one of the socket outlets should be supplied with mains voltage and mains frequency, while at least another socket outlet is electrically coupled to the integrated frequency converter and supplied with an electric special frequency. Consequently, different types of socket outlets are provided on the end face of the winder, and these socket outlets either permit an extension of the public network at 230 V or 400 V or provide the special converter current, in particular for the internal vibrator.

BRIEF DESCRIPTION OF THE DRAWINGS

The invention is explained in more detail below with the aid of the attached figures, in which.

DESCRIPTION OF THE PREFERRED EMBODIMENTS

Figure 1:
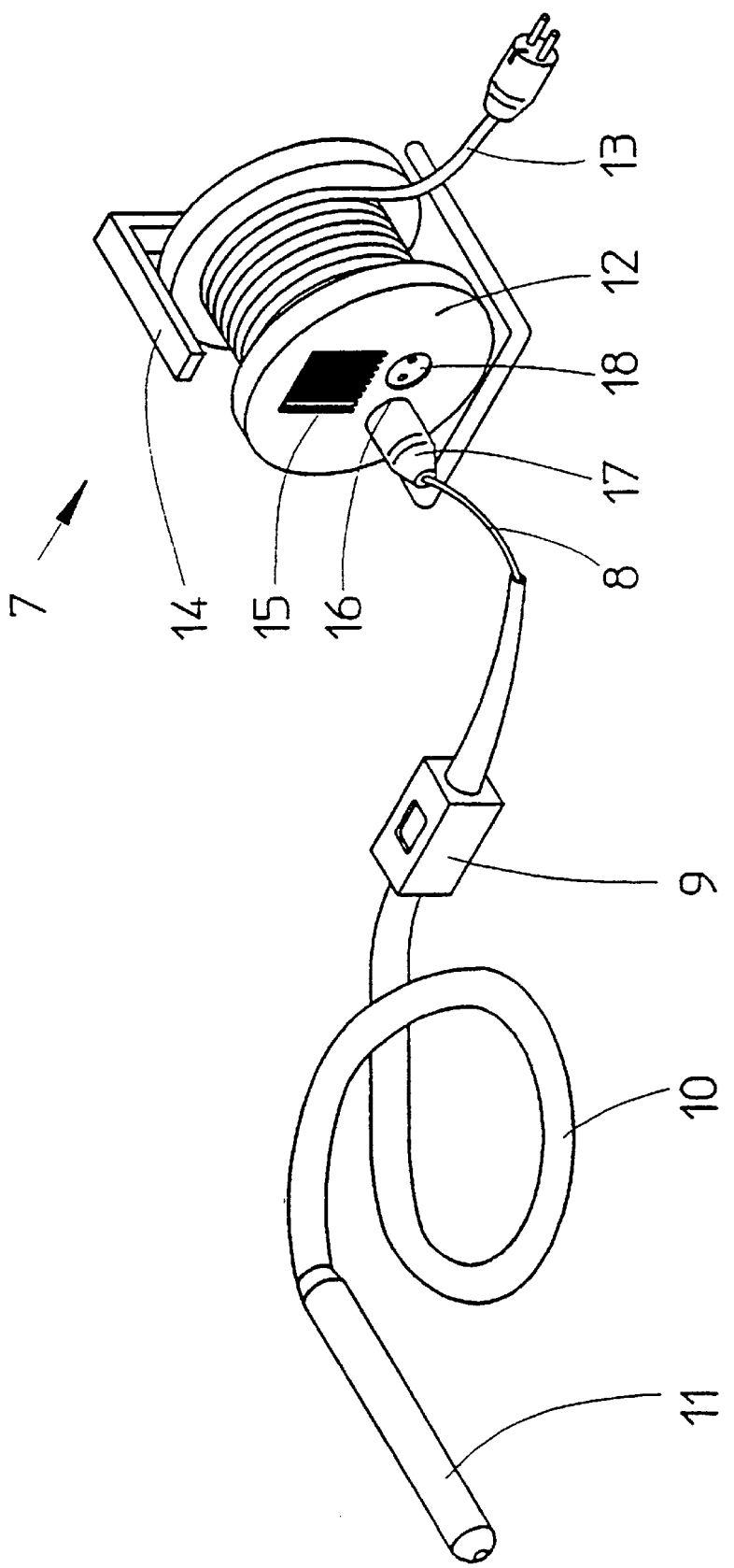
FIG. 1 shows a cable drum according to the invention with an attached internal vibrator.
Figure 2:
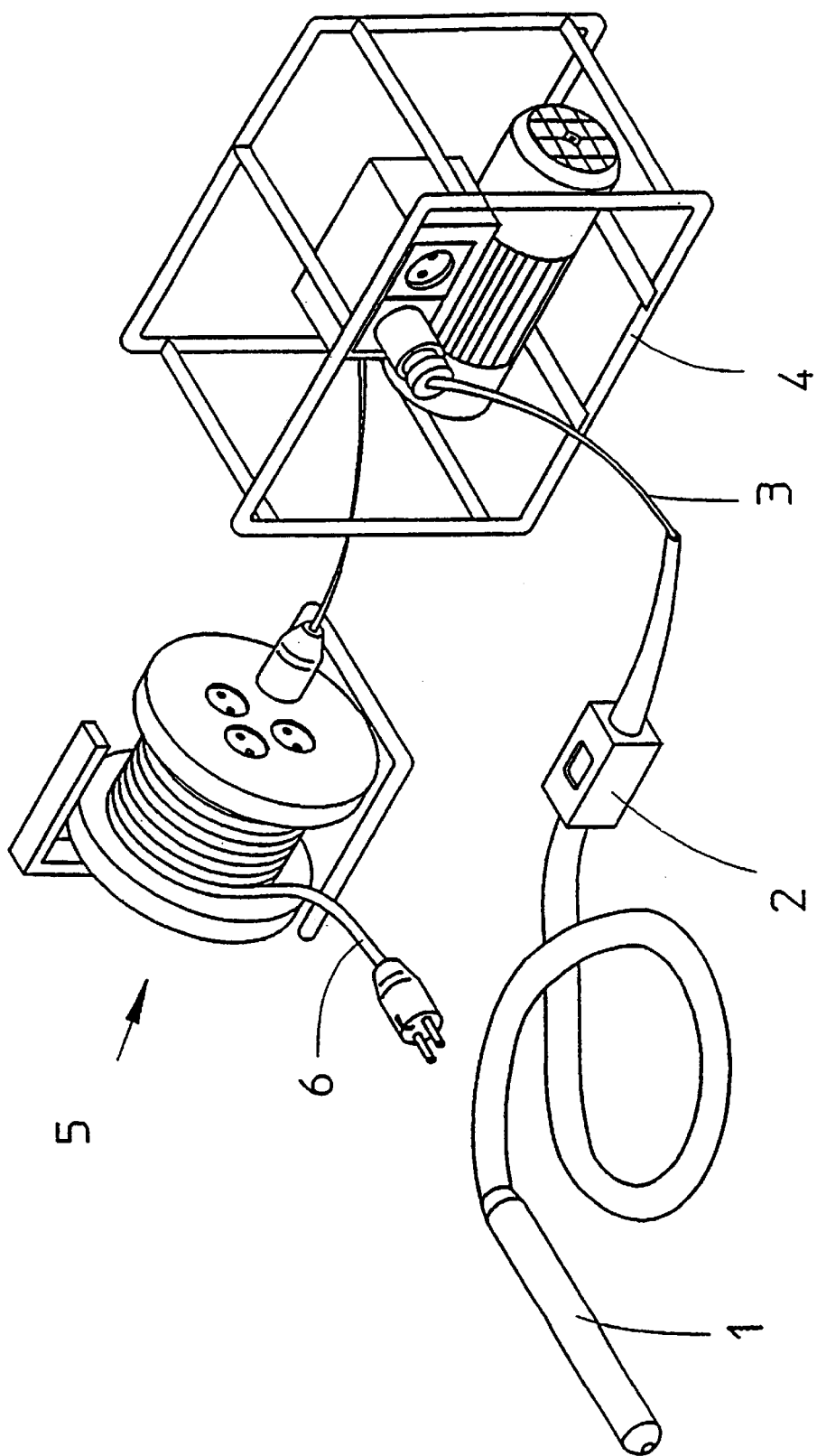
FIG. 2 shows a conventional arrangement with a cable drum, a separate frequency converter, and an internal vibrator.

FIG. 1 shows an arrangement consisting of a cable drum 7 according to the invention and an internal vibrator 11. The vibrator is connected to the cable drum 7 via a cable 8, a switch 9, and a cable 10. It includes a known asynchronous motor with an unbalanced mass in a vibrating cylinder (not shown).

Wound on a winder 12 is a cable 13 which, during unwinding, may be run to a public mains socket outlet. The winder 12 is rotatably mounted on a frame 14 in a known manner.

A frequency converter 15 is fitted in the core of the winder 12, i.e. essentially in the region which is surrounded by the wound cable 13. Depending on the embodiment of the cable drum, however, it may also be arranged outside the region surrounded by the cable 13, thus, for example, on the end face of the cable drum. Given an appropriate design of the frequency converter 15, it may also be arranged symmetrically in terms of its mass to a rotary axis (not identified in FIG. 1) of the winder 12, so that its center of gravity comes to lie on the rotary axis.

The frequency converter 15 works on a semiconductor basis, a factor which permits a compact and weight-reducing embodiment. It is supplied with mains voltage via the cable 13 and converts this mains voltage into a special voltage and a special frequency, e.g. 200 Hz at 42 V. The alternating voltage produced by the frequency converter 15 is delivered to a socket outlet 16, which is fastened to or integrated in the winder and to which a plug 17 can be connected, so that the internal vibrator 11 can be supplied with the special voltage.

In addition to the special frequency, at least one socket outlet 18 which is supplied with mains voltage may also be provided on the end face of the winder 12.

Depending on the embodiment of the cable drum, the socket outlets 16, 18 constitute an extension of the public network or a provision of the special converter current.

The combination or integration of the cable drum 7 with the miniaturized frequency converter 15 to form a constructional unit ensures a reduction in the number of parts, a reduction in the weight, and less sensitivity to moisture and mechanical effects. It also makes it easier to move the entire arrangement to different working locations, since no additional frequency converter has to be moved by the operator.

The housing of the cable drum 7, i.e. the winder 12, may at the same time serve as total insulation for the frequency converter 15.

What is claimed is:

1. A cable drum comprising:

a frame;

a winder which is rotatably mounted on the frame, on which at least one socket outlet is arranged, and on which a cable can be wound; and a frequency converter which is mounted on the winder so as to form an integrated unit with the winder, wherein the socket outlet is electrically coupled to the frequency converter and is supplied with an electric special frequency by the frequency converter.

2. The cable drum according to claim 1, wherein the frequency converter is arranged in a region of the winder onto which the cable can be wound.

3. A cable drum comprising:

a frame;

a winder which is rotatably mounted on the frame, on which at least one socket outlet is arranged, and on which a cable can be wound; and a frequency converter which is mounted on the winder, wherein the socket outlet is electrically coupled to the frequency converter and is supplied with an electric special frequency by the frequency converter, wherein the frequency converter is arranged in a region of the winder onto which the cable can be wound, and wherein a rotary axis of the winder passes through the region.

4. A cable drum comprising:

a frame;

a winder which is rotatably mounted on the frame, on which at least one socket outlet is arranged, and on which a cable can be wound; and a frequency converter which is mounted on the winder, wherein the socket outlet is electrically coupled to the frequency converter and is supplied with an electric special frequency by the frequency converter, wherein the frequency converter is supplied with main voltage and main frequency via the cable, and wherein the conversion of the frequency in the frequency converter is effected essentially by electronic semiconductors.

5. A cable drum comprising:

a frame;

a winder which is rotatably mounted on the frame, on which at least one socket outlet is arranged, and on which a cable can be wound; and a frequency converter which is mounted on the winder so as to form an integrated unit with the cable drum, wherein the socket outlet is electrically coupled to the frequency converter and is supplied with an electric special frequency by the frequency converter, wherein at least one other socket outlet is electrically connected to the cable and is arranged on at least one end face of the winder.

6. The cable drum according to claim 5, wherein at least the one other socket outlet is supplied with main voltage and main frequency.

7. In combination:

an internal vibrator including an asynchronous motor;

a first cable which supplies electrical power to the asynchronous motor; and a cable drum including a frame;

a second cable which is connectable to a source of main voltage and main frequency, a winder which is rotatably mounted on the frame and on which the second cable can be wound, a socket which is located on the winder and which supplies electrical power to the first cable, and a frequency converter which is mounted on the winder so as to form an integrated unit with the winder and which receives main voltage and main frequency from the second cable, wherein the socket outlet is electrically coupled to the frequency converter and is supplied with an electric special frequency by the frequency converter.

8. The combination according to claim 7, wherein the frequency converter is arranged in a region of the winder onto which the cable can be wound.

9. The combination according to claim 8, wherein a rotary axis of the winder passes through the region.

10. The combination according to claim 7, the frequency converter is supplied with mains frequency via the cable, and wherein the conversion of the frequency in the frequency converter is effected essentially by electronic semiconductors.

11. The combination according to claim 7, wherein at least one other socket outlet is electrically connected to the second cable and is arranged on at least one end face of the winder.

12. The combination according to claim 11, wherein at least the one other socket outlet is supplied with main voltage and main frequency.

* * * * *